United States Patent
Liao et al.

(10) Patent No.: US 9,069,178 B2
(45) Date of Patent: Jun. 30, 2015

(54) DISPLAY DEVICE AND LIQUID CRYSTAL PRISM CELL PANEL

(71) Applicant: SHENZHEN CHINA STAR OPTOELECTRONICS TECHNOLOGY CO., LTD., Shenzhen (CN)

(72) Inventors: Qiaosheng Liao, Shenzhen (CN); Changchengmr Lo, Shenzhen (CN)

(73) Assignee: SHENZHEN CHINA STAR OPTOELECTRONICS TECHNOLOGY CO. LTD., Shenzhen (CN)

( * ) Notice: Subject to any disclaimer, the term of this patent is extended or adjusted under 35 U.S.C. 154(b) by 33 days.

(21) Appl. No.: 14/232,913

(22) PCT Filed: Dec. 5, 2013

(86) PCT No.: PCT/CN2013/088602
§ 371 (c)(1),
(2) Date: Jan. 15, 2014

(65) Prior Publication Data
US 2015/0146116 A1 May 28, 2015

(51) Int. Cl.
*G02F 1/133* (2006.01)
*G02B 27/22* (2006.01)
*G02F 1/1343* (2006.01)

(52) U.S. Cl.
CPC ........ *G02B 27/2214* (2013.01); *G02F 1/13306* (2013.01); *G02F 1/134309* (2013.01)

(58) Field of Classification Search
CPC ............ G02B 27/2214; G02F 1/12327; G02F 1/13306; G02F 1/13409
USPC .......................................................... 349/15
See application file for complete search history.

(56) References Cited

U.S. PATENT DOCUMENTS

| | | | |
|---|---|---|---|
| 2012/0013606 A1* | 1/2012 | Tsai et al. ...................... 345/419 |
| 2012/0307169 A1* | 12/2012 | Ohyama et al. .................. 349/33 |
| 2013/0063691 A1* | 3/2013 | Takama et al. ................. 349/143 |
| 2014/0022635 A1* | 1/2014 | Wu et al. ......................... 359/463 |
| 2014/0204292 A1* | 7/2014 | Liao et al. ........................ 349/15 |
| 2014/0293171 A1* | 10/2014 | Jun et al. .......................... 349/15 |
| 2014/0293173 A1* | 10/2014 | Koito et al. ...................... 349/15 |
| 2014/0375905 A1* | 12/2014 | Chang et al. .................... 349/12 |

* cited by examiner

*Primary Examiner* — James Dudek
(74) *Attorney, Agent, or Firm* — Mark M. Friedman

(57) ABSTRACT

A display device with a liquid crystal prism cell panel is disclosed. The display device has a display panel and a liquid crystal prism cell panel, a black matrix layer which is disposed on the display panel further has spacers; the liquid crystal prism cell panel has a first and second substrates, a liquid crystal layer and a control circuit; light-shielding components are disposed on a position of the second substrate corresponding to a strip-shaped electrode which is disposed on the first substrate; the width of the light-shielding components is smaller than the width of the spacers. The liquid crystal device can enhance the display quality of a three-dimensional image.

19 Claims, 4 Drawing Sheets

DISPLAY DEVICE AND LIQUID CRYSTAL PRISM CELL PANEL

FIELD OF THE INVENTION

The present invention relates to a display device field, and in more particular to a display device and a liquid crystal prism cell panel.

BACKGROUND OF THE INVENTION

A technical scheme of a conventional auto-stereoscopic three-dimensional image display device is to show a three-dimensional image is generally:
Stacking a prism plate on the display panel, the prism plate having a number of cylindrical prisms so that the left-eye image and right-eye image of the display panel can be respectively provided for a user's left-eye and right-eye through the prisms of the prism plate.

Through practice, the inventor found at least one following problem existing in the prior art:
In the above technical scheme, the conventional display device effect a poorer three-dimensional image display quality. Thus, it is necessary to provide a new technical scheme to solve the above problem.

SUMMARY OF THE INVENTION

A objective of the present invention is to provide a display device and a liquid crystal prism cell panel which can enhance a display performance of a three-dimensional image.

To achieve the above objective, a technical scheme introduced by a preferred embodiment of the present invention as follows. A display device comprises a display panel disposing of a black matrix layer having at least two spacers; and a liquid crystal prism cell panel assembled with the display panel in union and comprises a first substrate where a first electrode layer is disposed with at least two strip-shaped electrodes; a second substrate where a second electrode layer is disposed, disposed with at least two light-shielding components on a position thereof corresponding to the strip-shaped electrodes. In between the first electrode layer and the second electrode layer, the liquid crystal layer is disposed and the control circuit is configured to control a voltage difference, wherein the light-shielding components has a first projection with a first width on a plane where the liquid crystal prism cell panel is located, and the spacers has a second projection, with a second width where the first width is smaller compared, on a plane where the liquid crystal prism cell panel is located; the first projection is located within an area where the second projection corresponds; at least two of the strip-shaped electrodes are arranged in parallel with each other, two adjacent electrodes of the strip-shaped electrodes are disposed on an edge of a region corresponding to either at least one pixel or at least one sub-pixel in the display panel.

In the above display device, a first center of a cross section of the light-shielding components and a second center of a cross section of the spacers are arranged in the same vertical line.

In the above display device, the light-shielding components are disposed between the second substrate and the second electrode.

In the above display device, the control circuit is configured to control the liquid crystal molecules in the liquid crystal layer being arranged in parallel with each other under a manner when the display device needs to display a two-dimensional image thereon, and the control circuit is further configured to control the liquid crystal molecules being arranged in a graded-index lens state under a manner when the display device needs to display a three-dimensional image thereon.

In the graded-index lens state of the above display device, at least two liquid crystal molecules between the two adjacent strip-shaped electrodes are arranged in an arc state to constitute a prism, a multilayer of which are stacked together to form a lens with a graded-index variance.

A display device comprises a display panel disposing of a black matrix layer having at least two spacers; and a liquid crystal prism cell panel assembled with the display panel in union and comprises a first substrate where a first electrode layer is disposed with at least two strip-shaped electrodes; a second substrate where a second electrode layer is disposed, disposed with at least two light-shielding components on a position thereof corresponding to the strip-shaped electrodes. In between the first electrode layer and the second electrode layer, the liquid crystal layer is disposed and the control circuit is configured to control a voltage difference, wherein the light-shielding components has a first projection with a first width on a plane where the liquid crystal prism cell panel is located, and the spacers has a second projection, with a second width where the first width is smaller compared, on a plane where the liquid crystal prism cell panel is located.

In the above display device, the first projection is located within an area where the second projection corresponds.

In the above display device, a first center of a cross section of the light-shielding components and a second center of a cross section of the spacers are arranged in the same vertical line.

In the above display device, the light-shielding components are disposed between the second substrate and the second electrode.

In the above display device, the control circuit is configured to control the liquid crystal molecules in the liquid crystal layer being arranged in parallel with each other under a manner when the display device needs to display a two-dimensional image thereon, and the control circuit is further configured to control the liquid crystal molecules being arranged in a graded-index lens state under a manner when the display device needs to display a three-dimensional image thereon.

In the graded-index lens state of the above display device, at least two liquid crystal molecules between the two adjacent strip-shaped electrodes are arranged in an arc state to constitute a prism, a multilayer of which are stacked together to form a lens with a graded-index variance.

In the above display device, there are at least two strip-shaped electrodes arranged in parallel with each other. Two adjacent electrodes of the strip-shaped electrodes are disposed on an edge of a region corresponding to either at least one pixel or at least one sub-pixel in the display panel.

A liquid crystal prism cell panel comprises a first substrate where a first electrode layer is disposed, with at least two strip-shaped electrodes; a second substrate where a second electrode layer is disposed, disposed with at least two light-shielding components on a position thereof corresponding to the strip-shaped electrodes. In between the first electrode layer and the second electrode layer, the liquid crystal layer is disposed and the control circuit is configured to control a voltage difference, wherein a black matrix layer has at least two spacers disposed on the display panel which is assembled with the liquid crystal prism cell panel, the light-shielding components has a first projection with a first width on a plane where the liquid crystal prism cell panel is located, and the spacers has a second projection, with a second width where the first width is smaller compared, on a plane where the liquid crystal prism cell panel is located.

In the above liquid crystal prism cell panel, the first projection is located within an area where the second projection corresponds.

In the above liquid crystal prism cell panel, a first center of a cross section of the light-shielding components and a second center of a cross section of the spacers are arranged in the same vertical line.

In the above liquid crystal prism cell panel, the light-shielding components are disposed between the second substrate and the second electrode.

In the above liquid crystal prism cell panel, the control circuit is configured to control the liquid crystal molecules in the liquid crystal layer being arranged in parallel with each other under a manner when the display device needs to display a two-dimensional image thereon, and the control circuit is further configured to control the liquid crystal molecules being arranged in a graded-index lens state under a manner when the display device needs to display a three-dimensional image thereon.

In the graded-index lens state of the above liquid crystal prism cell panel, at least two liquid crystal molecules between the two adjacent strip-shaped electrodes are arranged in an arc state to constitute a prism, a multilayer of which are stacked together to form a lens with a graded-index variance.

In the above liquid crystal prism cell panel, there are at least two strip-shaped electrodes arranged in parallel with each other. Two adjacent electrodes of the strip-shaped electrodes are disposed on an edge of a region corresponding to either at least one pixel or at least one sub-pixel in the display panel.

Compared to the prior art, the display device and the liquid crystal prism cell panel of the present invention can enhance a display performance of a three-dimensional image.

For a better understanding of the aforementioned content of the present invention, preferable embodiments are illustrated in accordance with the attached figures for further explanation.

DETAILED DESCRIPTION OF THE PREFERRED EMBODIMENTS

The following descriptions for the respective embodiments are specific embodiments capable of being implemented for illustrations of the present invention, with reference to the appended figures.

The term "embodiment" in the specification is used as typical example, demonstration or illustration. It is intended to provide a concept by specific ways. In the appended claims and throughout the specification, the terms "a" and "an" are used as the plain-English equivalents of the respective terms "one" or "more", unless specified otherwise or clear from the context to be directed to a singular form.

Figure 1:
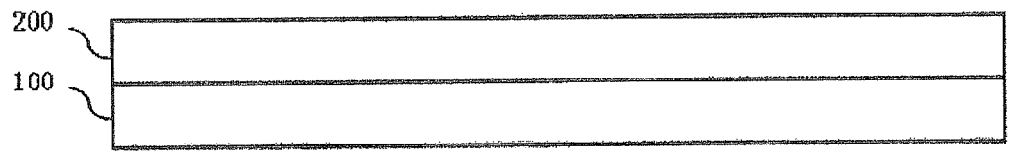
FIG. 1 is a schematically structural diagram illustrating a display device of the present invention.

Please refer to FIG. 1 which is a schematically structural diagram illustrating a display device of the present invention. The display device of the present invention comprises a display panel 100 and a liquid crystal prism cell panel 200, wherein the liquid crystal prism cell panel 200 is stacked above the display panel 100. The display panel can be LCD (Liquid Crystal Display) or OLED (Organic Light-emitting Diode) panels. The display device of the present invention can display two-dimensional images, as well as three-dimensional images. Also, it can be further switched from a two-dimensional image display state to a three-dimensional image display state.

Figure 2:
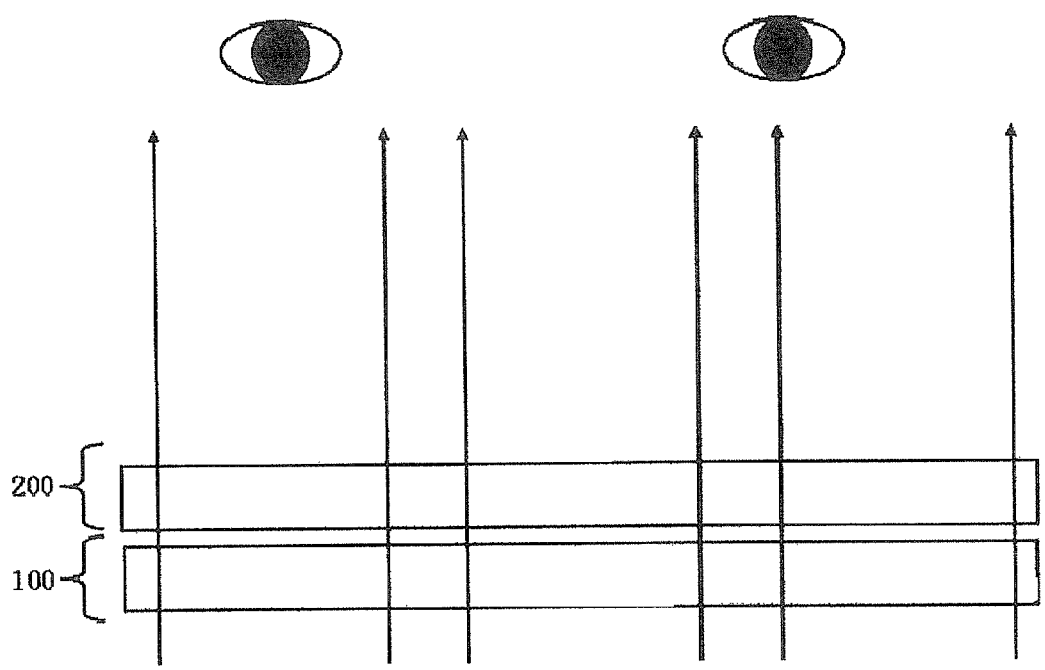
FIG. 2 is a schematic diagram illustrating a two-dimensional image of a display device in accordance with the present invention.

Please refer to FIG. 2 which is a schematic diagram illustrating a two-dimensional image of a display device in accordance with the present invention. When the display device of the present invention is in a two-dimensional image display state, the display panel 100 is in the corresponding working status for proving a two-dimensional image. It means that the display panel 100 is configured here to produce (display) a two-dimensional image. At the same time, the liquid crystal prism cell panel 200 is switched to a flat lens state when the display device is in a two-dimensional display state, wherein said flat lens is a lens without change of a light propagating direction.

Figure 3:
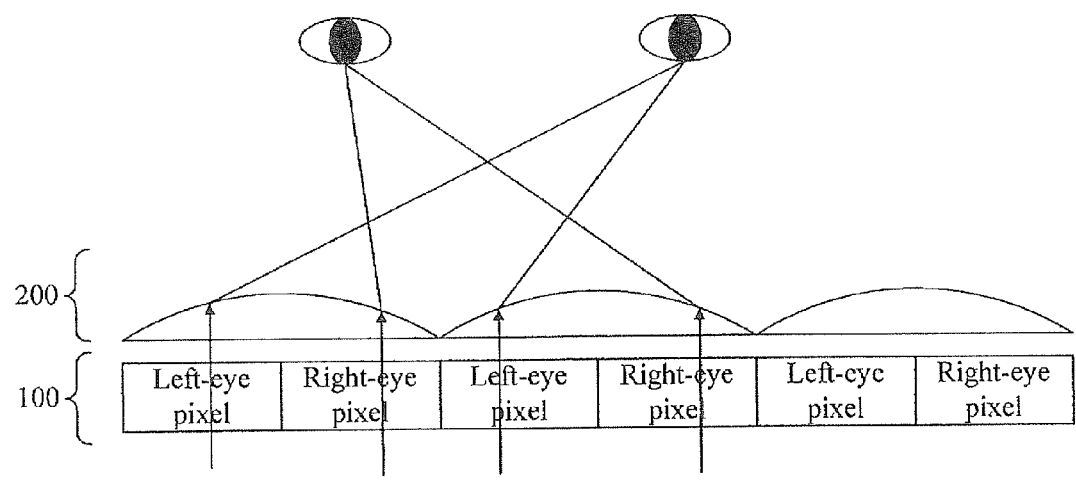
FIG. 3 is a schematic diagram illustrating a three-dimensional image of a display device in accordance with the present invention.

Please refer to FIG. 3 which is a schematic diagram illustrating a three-dimensional image of a display device in accordance with the present invention. When the display device of the present invention is in a three-dimensional image display state, the display panel 100 is in the corresponding working status for proving a three-dimensional image. It means that the display panel 100 is configured herein to produce (display) a three-dimensional image. At the same time, the liquid crystal prism cell panel 200 is switched into a liquid crystal graded-index lens (GRIN) state when the display device is in the three-dimensional display state, wherein said liquid crystal graded-index lens is a prism array which includes at least two prisms that are employed to refract the light corresponding to the left-eye pixel to the user's left eye, and refract the light corresponding to the right-eye pixel to the user's right eye.

Figure 4:
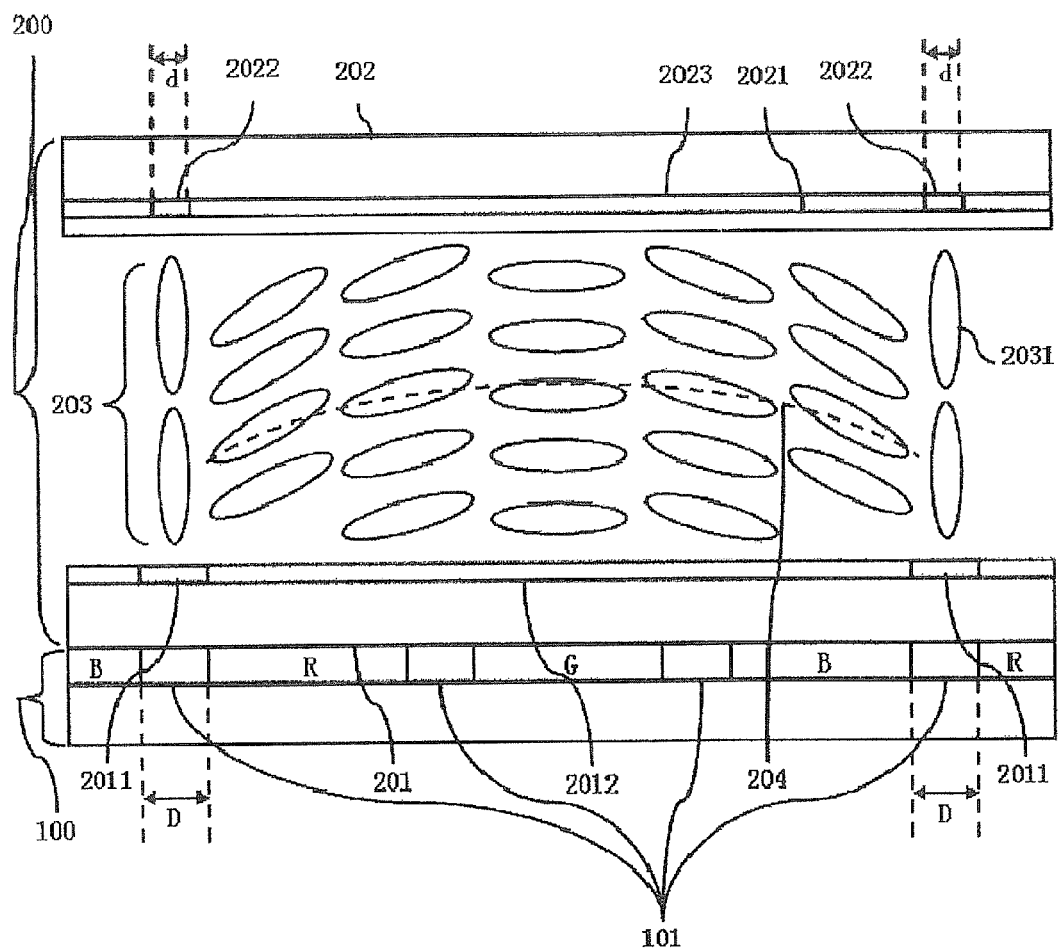
FIG. 4 is a schematic diagram of the first embodiment under a three-dimensional image state of a display device in accordance with the present invention.
Figure 5:
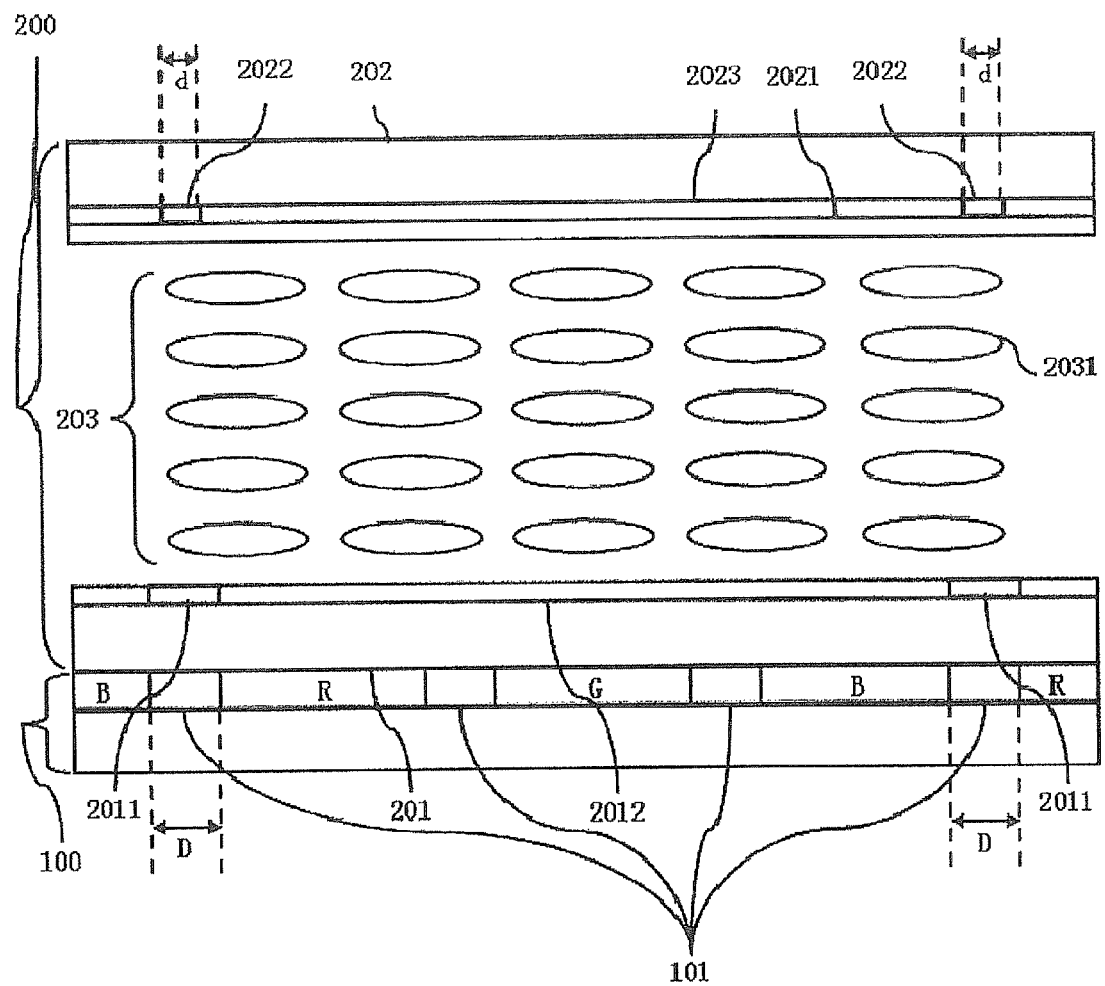
FIG. 5 is a schematic diagram of a two-dimensional image state of a display device in accordance with FIG. 4.

Please refer to FIG. 4 and FIG. 5. FIG. 4 shows a schematic diagram of a first embodiment under a three-dimensional image display state of a display device in accordance with the present invention, while FIG. 5 shows a schematic diagram illustrating the display device of FIG. 4 under a two-dimensional image display state.

A display device of the present embodiment comprises a display panel 100 and a liquid crystal prism cell panel 200. The display panel 100 includes a first light-emitting surface. The liquid crystal prism cell panel 200 comprises a light-incident surface and a second light-emitting surface, wherein the light-incident surface of the liquid crystal prism cell panel 200 is disposed on the first light-emitting surface of the display panel 100. Moreover, a black matrix which has at least two spacers 101 is disposed on the display panel 100.

The liquid crystal prism cell panel 200 comprises a first substrate 201, a second substrate 202, a liquid crystal layer 203 and a control circuit, wherein the first substrate 201 is disposed with a first electrode layer 2011 thereon, and the second substrate 202 is disposed with a second electrode layer 2021 thereon. In between the first electrode layer 2011 and the second electrode layer 2021, the liquid crystal layer 203 is disposed and the control circuit is configured to control a voltage difference, wherein the first electrode later 2011 includes at least two strip-shaped electrodes 2011, and at least two light-shielding components 2022 are disposed on a position of the second substrate 202 corresponding to the strip-shaped electrodes 2011. The at least two strip-shaped electrodes 2011 are arranged in parallel with each other and with the data lines of the display panel 100, while the strip-shaped electrodes are vertical to the scan lines/gate lines of the display panel 100. The two adjacent strip-shaped electrodes 2011 are disposed on an edge of a region corresponding to either at least one pixel or at least one sub-pixel in the display panel 100. The light-shielding components has a first projection with a first width "d" on a plane where the liquid crystal prism cell panel is located, and the spacers has a second projection, with a second width "D" where the first width is smaller compared, on a plane where the liquid crystal prism cell panel is located.

In the present embodiment, the first width is smaller than the second width, therefore it may effectively reduce the effect of the light-shielding components 2022 on a two-dimensional image display quality, ensuring the performance of a three-dimensional image display, simultaneously.

In the display device of the present invention, the control circuit is configured to control the liquid crystal molecules 2031 in the liquid crystal layer 203 being arranged in parallel with each other under a manner when the display device needs to display a two-dimensional image thereon, as show in FIG. 5. At that time, the control circuit is configured to control the voltage difference in zero volts between the first electrode layer 2011 and the second electrode layer 2021. The control circuit is further configured to control the liquid crystal molecules 2031 in the liquid crystal layer 203 being arranged in a graded-index lens state under a manner when the display device needs to display a three-dimensional image thereon, as show in FIG. 4. In the graded-index lens state, at least two liquid crystal molecules 2031 between the two adjacent strip-shaped electrodes 2011 are arranged into an arc state 204. The liquid crystal molecules 2031 arranged in an arc state 204 constitute a prism, and therefore refract lights in a determined direction. In the present embodiment, the liquid crystal molecules 2031 with the arc state 204 are layered and stacked together to be a multilayer forming a graded-index (gradient change) lens (prism) which is a lens with a graded-index variance.

In the present embodiment, the light propagating direction of the image produced by the display panel 100 can change in gradient through the liquid crystal graded-index lens. Thus, the light may propagate (irradiate, refract) in different directions, which is conducive to the rendering of a three-dimensional display (auto-stereoscopic display, naked-eye stereoscopic display), and enhances the display performance of a three-dimensional image.

In the liquid crystal prism cell panel 200, a liquid crystal dumping region is located in the position corresponding to the light-shielding components 2012. In this region, the liquid crystal molecules 2031 perform in a dumping status. Here, the light irradiating to the dumping region will propagate along in an unexpected direction. In the present embodiment, due to a fact that the light-shielding components 2022 are disposed on a position of the second substrate 202 corresponding to the strip-shaped electrodes 2011, the light-shielding components 2022 may block divergent light. Particularly, the light-shielding components 2022 may be configured to absorb uncontrolled light in order to further reduce crosstalk in a three-dimensional display, and to enhance the display performance of a three-dimensional image.

In the embodiment, the first projection is located within an area where the second projection corresponds, namely, the first projection is totally covered by the second projection. A first center of a cross section of the light-shielding components 2022 and a second center of a cross section of the pacers 101 are arranged in the same vertical line, which means that the light-shielding components 2022 and the spacers 101 are aligned in the vertical direction. That is conducive to reducing the impact of the light-shielding components 2022 on the display quality of the display panel 100 and the liquid crystal prism cell panel 200.

In the display device of the present invention, the light-shielding components 2022 are disposed between the second substrate 202 and the second electrode layer 2021. The light-shielding components are coated with an insulating layer 2023. The second electrode layer 2021 is disposed on the insulating layer 2023. In the present embodiment, a material of the light-shielding components 2022 may use the same material as the black matrix layer. The light-shielding components 2022 may be formed by the following method of: coating (arranging) the light-shielding components 2022 on a position of the second substrate 202 corresponding to the strip-shaped electrodes 2011, and then coating the insulating layer 2023 and the second electrode layer 2021 on the second substrate 202 with the light-shielding components 2022, respectively.

Various features have been grouped together in one or more examples with the purpose of streamlining the disclosure. Many other examples will be apparent to one skilled in the art upon reviewing the above specification. All alternatives, modifications and equivalents are intended to be covered by the present invention. Also, in the appended claims and throughout the specification, the terms "including" and "having" are used as the plain-English equivalents of the term "comprising" and the like.

Accordingly, the foregoing descriptions of a preferred embodiments of the invention have been presented for purposes of illustration and description. They are not intended to be to be exhaustive or to limit the invention to the precise forms disclosed. Obvious modifications or variations are possible in light of the above teachings with regards to the specific embodiments. The embodiments were chosen and described in order to best illustrate the principles of the invention and its practical applications, thereby enabling one of ordinary skill in the art to best utilize the invention in various embodiments and with various modifications as are suited to the particular use contemplated. It is intended that the scope of the invention be defined by the claims which are appended hereto.

What is claimed is:

1. A display device comprising:
    a display panel disposing of a black matrix layer having at least two spacers; and
    a liquid crystal prism cell panel assembled with the display panel in union and comprising:
        a first substrate where a first electrode layer is disposed with at least two strip-shaped electrodes;
        a second substrate where a second electrode layer is disposed, disposed with at least two light-shielding components on a position thereof corresponding to the strip-shaped electrodes;
        a liquid crystal layer disposed between the first electrode layer and the second electrode layer; and
        a control circuit configured to control a voltage difference between the first electrode layer and the second electrode layer; wherein
    the light-shielding components has a first projection with a first width on a plane where the liquid crystal prism cell panel is located, and the spacers has a second projection, with a second width where the first width is smaller compared, on a plane where the liquid crystal prism cell panel is located;

the first projection is located within an area where the second projection corresponds;

at least two of the strip-shaped electrodes are arranged in parallel with each other, two adjacent electrodes of the strip-shaped electrodes are disposed on an edge of a region corresponding to neither at least one pixel or sub-pixel in the display panel.

2. The display device as claimed in claim 1, wherein a first center of a cross section of the light-shielding components and a second center of a cross section of the spacers are arranged in the same vertical line.

3. The display device as claimed in claim 1, wherein the light-shielding components are disposed between the second substrate and the second electrode layer.

4. The display device as claimed in claim 1, wherein the control circuit is configured to control the liquid crystal molecules in the liquid crystal layer being arranged in parallel with each other under a manner when the display device needs to display a two-dimensional image thereon, and the control circuit is further configured to control the liquid crystal molecules in the liquid crystal layer being arranged in a graded-index lens state under a manner when the display device needs to display a three-dimensional image thereon.

5. The display device as claimed in claim 4, wherein in the graded-index lens state, at least two liquid crystal molecules between the two adjacent strip-shaped electrodes are arranged in an arc state to constitute a prism, a multilayer of which are stacked together to form a lens with a graded-index variance.

6. A display device comprising:
a display panel disposing of a black matrix layer having at least two spacers; and
a liquid crystal prism cell panel assembled with the display panel in union, and comprising:
a first substrate where a first electrode layer is disposed with at least two strip-shaped electrodes;
a second substrate where a second electrode layer is disposed, disposed with at least two light-shielding components on a position thereof corresponding to the strip-shaped electrodes;
a liquid crystal layer disposed between the first electrode layer and the second electrode layer; and
a control circuit configured to control a voltage difference between the first electrode layer and the second electrode layer; wherein
the light-shielding components has a first projection with a first width on a plane where the liquid crystal prism cell panel is located, and the spacers has a second projection, with a second width where the first width is smaller compared, on a plane where the liquid crystal prism cell panel is located.

7. The display device as claimed in claim 6, wherein the first projection is located within an area where the second projection corresponds.

8. The display device as claimed in claim 7, wherein a first center of a cross section of the light-shielding components and a second center of a cross section of the spacers are arranged in the same vertical line.

9. The display device as claimed in claim 6, wherein the light-shielding components are disposed between the second substrate and the second electrode layer.

10. The display device as claimed in claim 6, wherein the control circuit is configured to control the liquid crystal molecules in the liquid crystal layer being arranged in parallel with each other under a manner when the display device needs to display a two-dimensional image thereon, and the control circuit is further configured to control the liquid crystal molecules in the liquid crystal layer being arranged in a graded-index lens state under a manner when the display device needs to display a three-dimensional image thereon.

11. The display device as claimed in claim 10, wherein in the graded-index lens state, at least two liquid crystal molecules between the two adjacent strip-shaped electrodes are arranged in an arc state to constitute a prism, a multilayer of which are stacked together to form a lens with a graded-index variance.

12. The display device as claimed in claim 6, wherein at least two strip-shaped electrodes are arranged in parallel with each other, two adjacent electrodes of the strip-shaped electrodes are disposed on an edge of a region corresponding to either at least one pixel or sub-pixel in the display panel.

13. A liquid crystal prism cell panel comprising:
a first substrate where a first electrode layer is disposed with at least two strip-shaped electrodes;
a second substrate where a second electrode layer is disposed, disposed with at least two light-shielding components on a position thereof corresponding to the strip-shaped electrodes;
a liquid crystal layer disposed between the first electrode layer and the second electrode layer; and
a control circuit configured to control a voltage difference between the first electrode layer and the second electrode layer; wherein
a display panel assembled with the liquid crystal prism cell panel disposes of a black matrix layer having at least two spacers, the light-shielding components has a first projection with a first width on a plane where the liquid crystal prism cell panel is located, and the spacers has a second projection, with a second width where the first width is smaller compared, on a plane where the liquid crystal prism cell panel is located.

14. The liquid crystal prism cell panel as claimed in claim 13, wherein the first projection is located within an area where the second projection corresponds.

15. The liquid crystal prism cell panel as claimed in claim 14, wherein a first center of a cross section of the light-shielding components and a second center of a cross section of the spacers are arranged in the same vertical line.

16. The liquid crystal prism cell panel as claimed in claim 13, wherein the light-shielding components are disposed between the second substrate and the second electrode layer.

17. The liquid crystal prism cell panel as claimed in claim 13, wherein the control circuit is configured to control the liquid crystal molecules in the liquid crystal layer being arranged in parallel with each other under a manner when the display device needs to display a two-dimensional image thereon, and the control circuit is further configured to control the liquid crystal molecules in the liquid crystal layer being arranged in a graded-index lens state under a manner when the display device needs to display a three-dimensional image thereon.

18. The liquid crystal prism cell panel as claimed in claim 17, wherein in the graded-index lens state, at least two liquid crystal molecules between the two adjacent strip-shaped electrodes are arranged in an arc state to constitute a prism, a multilayer of which are stacked together to form a lens with a graded-index variance.

19. The liquid crystal prism cell panel as claimed in claim 13, wherein at least two strip-shaped electrodes are arranged in parallel with each other, two adjacent electrodes of the strip-shaped electrodes are disposed on an edge of a region corresponding to either at least one pixel or sub-pixel in the display panel.

\* \* \* \* \*